UNITED STATES PATENT OFFICE.

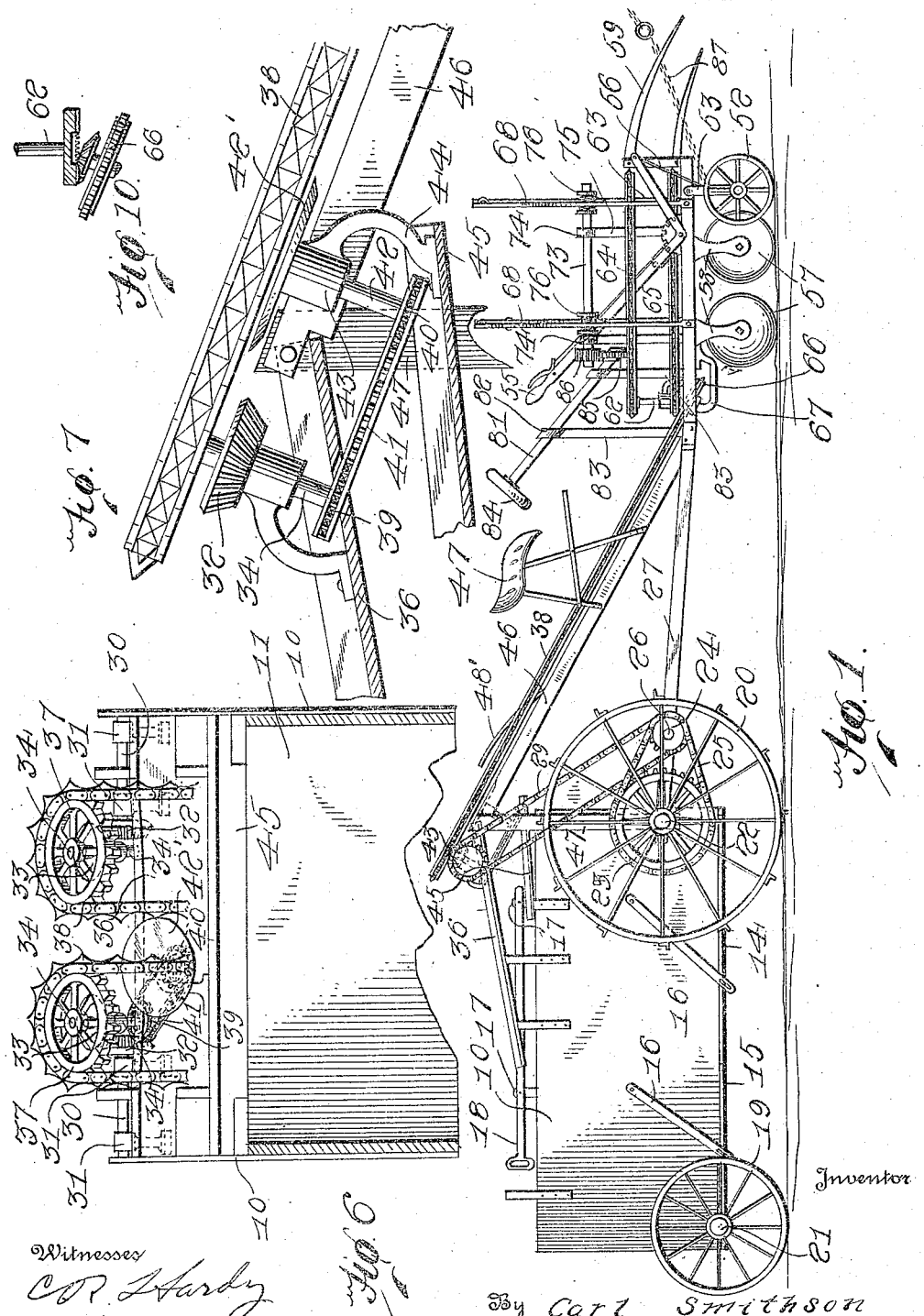

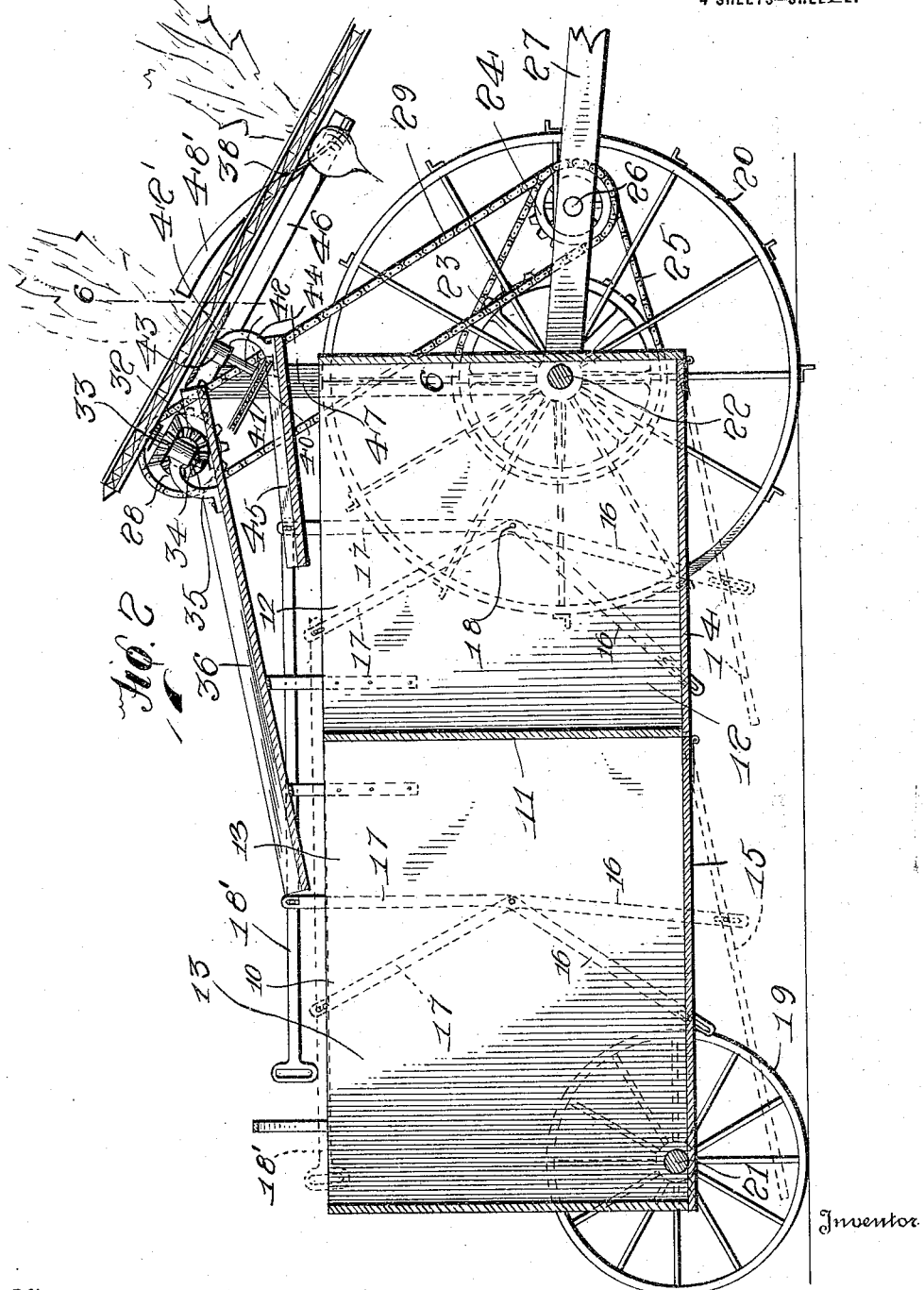

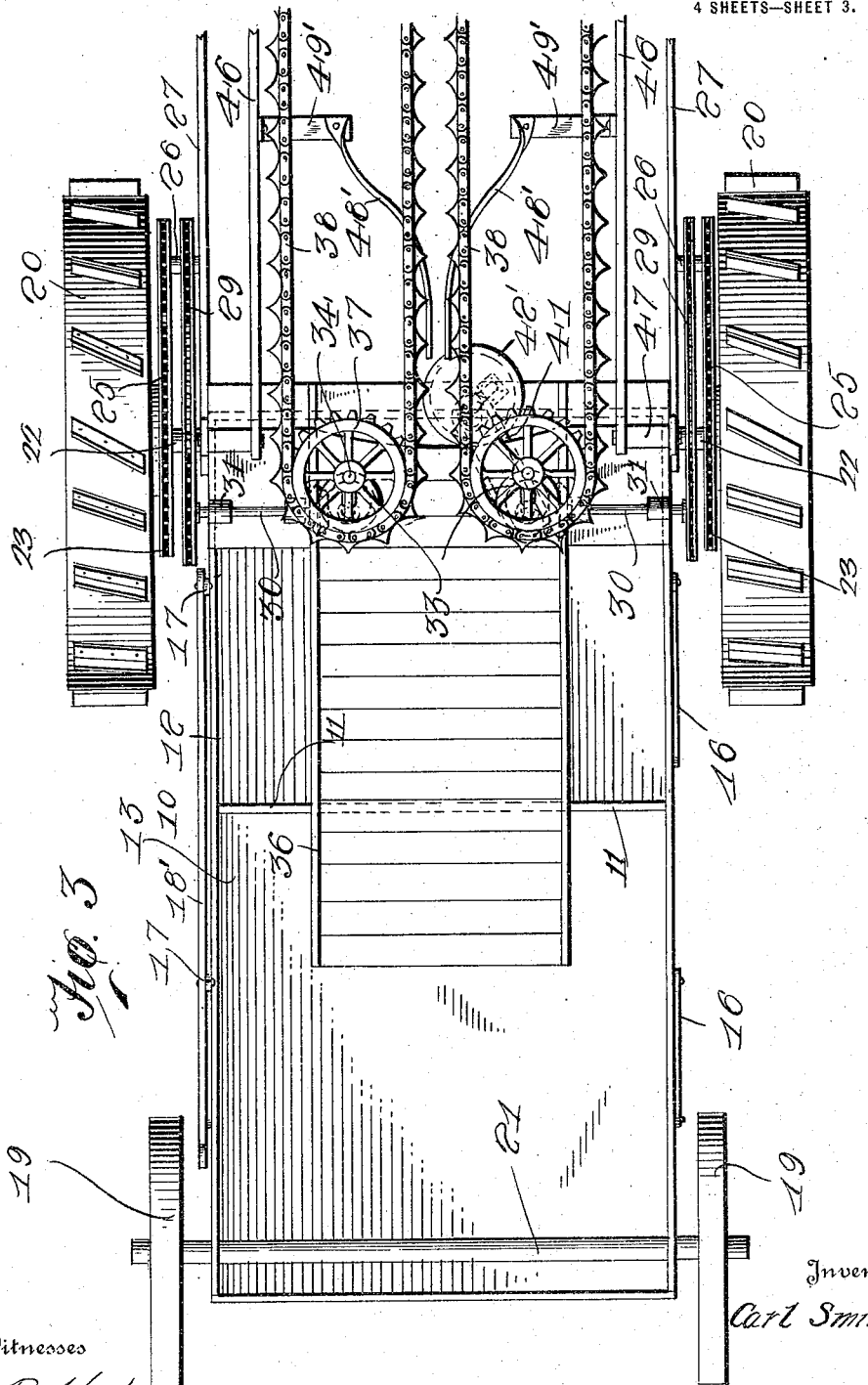

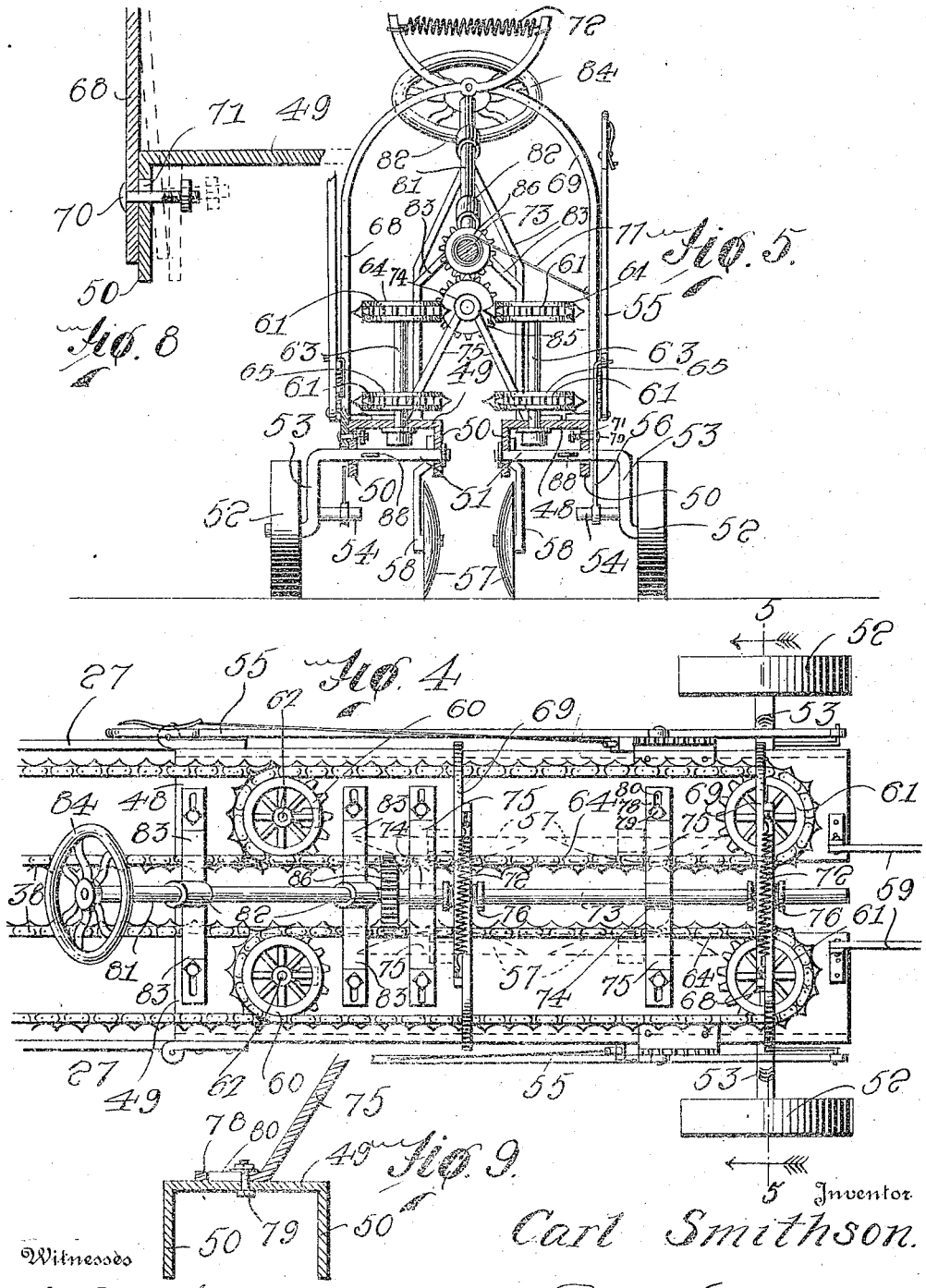

CARL SMITHSON, OF ALVA, OKLAHOMA.

BEET PULLING AND TOPPING MACHINE.

1,191,355.  Specification of Letters Patent.  Patented July 18, 1916.

Application filed May 25, 1915. Serial No. 30,427.

*To all whom it may concern:*

Be it known that I, CARL SMITHSON, a citizen of the United States of America, residing at Alva, in the county of Woods and State of Oklahoma, have invented certain new and useful Improvements in Beet Pulling and Topping Machines, of which the following is a specification, reference being had therein to the accompanying drawing.

This invention relates to a beet harvester and the principal object of the invention is to provide the harvester with an improved type of digging device that may be adjusted to regulate itself to the size of the beets being harvested.

Another object of the invention is to provide an improved type of receptacle for the roots and beet tops and to so construct the chute leading to the receptacle that the roots may be deposited in one chamber of the receptacle and the tops in a second chamber.

Another object of the invention is to provide an improved conveyer for carrying the beets from the digging device to the receptacle.

Another object of the invention is to provide an improved means for adjusting the digging device.

With these and other objects in view this invention consists of certain novel combinations, constructions and arrangements of parts as will be hereinafter fully described and claimed.

This invention is illustrated in the accompanying drawings, wherein:

Figure 1 is a side elevation of the complete beet harvester. Fig. 2 is a longitudinal sectional view through the receptacle and rear portion of the endless conveyer. Fig. 3 is a top plan view of the rear portion of the harvester. Fig. 4 is a top plan view of the forward portion of the harvester. Fig. 5 is a sectional view taken along the line 5—5 in Fig. 4. Fig. 6 is a section taken along the line 6—6 in Fig. 2. Fig. 7 is a longitudinal sectional view showing the manner of turning the knife carrying shaft from one of the supporting shafts to the endless conveyer. Fig. 8 is a fragmentary sectional view showing the manner in which the supporting arms of the cutting device are mounted. Fig. 9 is a fragmentary sectional view showing the manner in which certain standards supporting the shaft of the cutting device are mounted. Fig. 10 is a side elevation partly in section of a pair of gears used in connection with this device, illustrating the manner in which rotary movement is imparted to one of the gears for driving the conveyer chains.

The receptacle 10 is in the shape of a wagon body and is provided with a vertical partition 11 dividing the receptacle into the forward and rear chambers 12 and 13. The forward chamber is to receive the beet roots and the rear chamber is to receive the beet tops. Bottoms 14 and 15 are provided for the receptacles 12 and 13 and are hinged as shown in Fig. 2 so that when desired the bottoms may be lowered as indicated in dotted lines, thus permitting the beets and tops to drop out of the chambers on the ground. These bottoms are supported at one side by the supporting links 16 and at the opposite side by the bell-crank levers 17 which are pivotally connected with the sides of the receptacle 10 by means of the pins 18. A handle 18' connects the upper ends of the levers 17 and is pulled toward the rear of the receptacle to the dotted line position shown in Fig. 2 when it is desired to drop the bottoms 14 and 15 to permit the beet roots and tops to empty upon the ground.

The receptacle is supported by the rear wheels 19 and forward wheels 20 which are mounted upon the axles 21 and 22, the forward axles 22 also carrying the large sprocket wheels 23. The rear wheels 19 may be loosely mounted upon the axles 21 if desired, but the forward wheels 20 which are the power wheels for the beet conveying mechanism, must be rigidly mounted upon the axle 22 so that when the machine is in motion the sprocket wheels 23 which are rigidly mounted upon the axle 22 will be rotated and thus rotary motion conveyed to the small sprocket wheels 24 through the medium of the sprocket chains 25. These small sprocket wheels 24 are mounted upon stub axles 26 carried by the connecting bars 27 and are connected with the sprocket wheels 28 by means of the sprocket chains 29. The sprocket wheels 28 are mounted upon the short transversely extending shafts 30 which extend through the bearings 31 and carry beveled gears 32 meshing with the beveled gears 33 rigidly mounted upon the inclined shafts 34. These inclined shafts 34 are carried by the brackets 35 which are mounted upon the chute 36 and are provided at their upper ends with sprocket wheels 37 to engage the sprocket chains 38. One of the inclined shafts 34 carries a lower sprocket wheel 39 which is connected with a sprocket wheel 40 by means of the sprocket chain 41. This sprocket wheel 40 is mounted upon the lower end of the shaft 42 which passes through the bearing 43 of the bracket 44 which is mounted near the forward end of the chute 45. A circular knife 42' is at the upper end of the shaft 42 and positioned just beneath the sprocket chains which form the conveyer chains so that the beet roots will be cut from the tops by the knife. An inspection of Fig. 7 will show that when the roots are cut from the tops they will fall into the chute 45 and thus be conveyed into the chamber 12 and that the tops will be conveyed beyond the knife and when released will drop into the chute 36 and be conveyed to the chamber 13.

Inclined supporting bars 46 extend from the standards 47 to the platforms 48 and 49 and are secured beneath the inner flights of the conveyer chains 38. These inclined bars 46 not only afford bracing means in assisting in connecting the cutting device with the receptacle, but also provide means for supporting the driver's seat 47. Spring strips 48' are connected with the upper end portion of the bars 46 by means of the brackets 49' and extend inwardly beneath the spaces between the inner flights of the conveyer chains as shown in Fig. 3 so that the leaves of the beet top will be held bunched together and raised as shown in Fig. 2 so that the leaves will not be cut by the revolving knife 42'. By this arrangement the beet roots can be cut as near to the tops as desired without any danger of the leaves hanging down in the path of the knife and thus being cut and dropped into the chute 45.

The platforms 48 and 49 are provided with the side flanges 50 in which the axles 51 which carry the supporting wheels 52 are rotatably mounted. These axles 51 are provided with the bent end portions 53 which carry pins 54 with which the latch levers 55 are connected by means of the links 56 so that the wheels may be raised and lowered by moving the latch levers to rotate the axles. The digging disks 57 are rotatably mounted upon the supporting arms 58 and are intended to be positioned upon opposite sides of the row of beets which it is intended to gather, so that the ground will be loosened thus permitting the beets to be lifted out of the ground. By adjusting the wheels 52, the depth at which the wheels 57 will cut may be regulated, and thus the machine may be adjusted so that the disks will cut into the ground the desired amount. Fingers 59 extend from the forward ends of the platforms and are intended to engage the leaves of the beets and hold them in a lifted position so that they can be engaged by traveling chains and thus brought into engagement with the conveying chains 38 so that the beets may be lifted from the ground and conveyed to the receptacle.

Sprocket wheels 60 and 61 are mounted upon the upper and lower ends of the shafts 62 and 63 and the upper and lower sprocket chains 64 and 65 pass around these sprocket wheels 60 and 61. These sprocket chains 64 are intended to engage the tops of the beets so that the beet leaves will be held in the lifted position and conveyed to the point where they will be engaged by the conveying chains 38. The conveyer chains 38 pass around the lower sprocket wheels 66 which are carried by the brackets 67 and transmit rotary motion to the shafts 62 so that the sprocket chains 64 and 65 will be rotated.

From the above description it will be readily seen that the chains of this machine are operated through the medium of the driving wheels 20 since the driving wheels 20 rotate the axles 22 and thus rotary motion is conveyed by the sprocket chains 25 and 29 to the conveying chains 38 which in their turn rotate the sprocket wheels 66 which convey rotary motion to the shafts 62 and thus cause the chains 64 and 65 to move. Tongs 68 and 69 are connected with the outer flanges of the platforms 49 by means of the bolts 70 which pass through the slots 71 formed in the outer flanges of the platforms. This forms a rather loose connection between the tongs and the platforms so that when the platforms are moved closer together or farther apart, the tongs may have the necessary pivotal movement as indicated in the dotted lines of Fig. 8. These tongs have their upper ends connected by the expansion spring 72 so that the platforms will be normally held far apart. A shaft 73 is rotatably supported in the bearings 74 at the upper ends of the supporting standards 75 and carries drums 76 upon which there are wound cables 77. These cables 77 are connected with the tongs 69, there being two sets of tongs as shown in Fig. 1, so that when the shaft 73 is rotated the cables will be wound upon the drums and thus the tongs drawn together to move the platforms 50 toward each other. When the shaft is turned to permit the cables to unwind, the springs 72 will cause the tongs to open thus moving the platforms away from each other. The lower ends of the standards 75 are provided with feet 78 which are slidably connected with the upper faces of the platforms 49 by means of the bolts 79 which pass through the slots 80. This permits the platforms to be moved when necessary. A diagonal shaft 81 is rotatably supported in the bearings 82 of the standards 83 and carries a hand wheel 84 at its upper end and a gear wheel 85 at its lower end. This gear wheel 85 meshes in a gear wheel 86 mounted upon the shaft 73 so that when the hand wheel is turned by the driver, the shaft 73 will be rotated in the desired direction.

When it is desired to use this machine the draft animals are connected with the platforms by means of the chains 87 which have their inner ends secured to the eyes 88. The machine is then drawn to the field where the beets are growing and is positioned so that when drawn across the field the row of beets will be positioned between the cutting blades. The platforms are then adjusted so that the disks will be the right distance apart and the wheels adjusted so that they will cut into the ground the desired depth. The machine is then drawn across the field and as it moves along the fingers 59 will raise the beet leaves which have fallen on the ground and hold them up so that the leaves will be engaged by the chains 64 and 65. These chains do not lift the leaves from the ground, but simply hold the leaves in a lifted position so that they will be all engaged by the conveying chain 38. The ground around the beets is loosened by the disks 57 and it will, therefore, be easy for the conveying chains 38 to draw the beets from the ground. As soon as the beets have been conveyed to a point near the top of the diagonal bars 46, the leaves pass between the spring strips 48 and thus are bunched together so that they will be held close together and out of the way of the cutting knife. The cutting knife cuts the roots from the top and these roots drop into the chute 45 down which they roll into the receptacle 12. The top is carried on upwardly until it is over the top of the chute 36 and is then released and permitted to drop into the chute 36. The tops travel down the chute 36 into the receptacle 13. As soon as the receptacles are full, the handle 18' is moved to rock the levers 17 and permit the bottoms 14 and 15 to move downwardly, thus permitting the tops and the roots to roll upon the ground.

A machine has thus been provided with which the beets can be removed from the ground without being cut or injured by being dug out of the ground and which is so constructed that the beets can be very conveniently and quickly carried to the receptacles where the roots and tops are dropped into the separate compartments.

It will also be seen that the digging portion of the machine is so constructed that it may be adjusted according to the size of the beets which it is desired to dig.

What is claimed is:

1. A beet harvester comprising a receptacle, a platform positioned in front of said receptacle, means for normally holding said platforms in spaced relation, means for drawing said platforms toward each other, digging means carried by said platforms, means carried by said platforms for engaging the tops of a row of beets and holding the same in an elevated position, means for removing the beets from the ground and conveying the same to a point above said receptacle, and means for severing the roots of the beets from the top of the beets to permit the beet roots to drop into said receptacle.

2. A beet harvester comprising a receptacle, platforms in front of said receptacle, supporting wheels for said platforms, digging means carried by said platforms, tongs having their lower ends connected with said platforms, springs carried by said tongs for normally opening said tongs to hold said platforms in spaced relation, means for drawing said tongs to a closed position to draw said platforms toward each other against the tension of the springs, means carried by said platforms for elevating and guiding the beet tops, means for removing the beets from the ground and conveying them from said platforms to said receptacle, and means for covering the roots of the beets from the tops whereby the roots will be permitted to drop into said receptacle.

3. A beet harvester comprising a receptacle, platforms in front of said receptacle, tongs carried by said platforms, resilient means for normally holding said tongs in an open position, bearings having their supporting standards connected with said platforms, a shaft rotatably supported in said bearings, drums carried by said shaft, cables wound upon said drums and engaging said tongs for drawing said tongs to a closed position, means for rotating said shaft to wind said cables upon said drums, digging means carried by said platforms, means carried by said platforms for elevating and guiding the tops of the row of beets, conveying means for engaging the tops of a row of beets to remove the beets from the ground and convey the beets to said receptacle, and means for cutting roots of the beets from the top of the beets and permitting the beets to drop into said receptacle.

4. A beet harvester comprising a receptacle, platforms in front of said receptacle, adjustable supporting means for said platforms, means for normally holding said platforms in spaced relation, means for adjusting the distance between said platforms, digging means carried by said platforms, rotary shafts carried by said platforms, sprocket wheels carried by said shafts, sprocket chains passing around said sprocket wheels, conveying means leading from said platforms to said receptacle, means for transmitting motion from said conveying means to said shafts, whereby said sprocket chains may be moved, and means for cutting the beet roots from the beet tops to permit the beet roots to drop into said receptacle.

5. A beet digger comprising a receptacle, platforms in front of said receptacle, digging means carried by said platforms, vertical shafts carried by said platforms, sprocket wheels mounted upon said shaft, sprocket chains passing around said sprocket wheels, brackets carried by said receptacle and platforms, sprocket wheels rotatably connected with said brackets, means for transmitting rotary motion from the sprocket wheels, means for transmitting rotary motion from the last mentioned sprocket wheels of said platform to said shafts, conveyer chains passing around the sprocket wheels carried by said brackets whereby beets may be conveyed from said platforms to said receptacle, digging means carried by said platforms, and means for cutting the beet roots from the beet tops to permit the beet roots to fall into said receptacle.

In testimony whereof I hereunto affix my signature in presence of two witnesses.

CARL SMITHSON.

Witnesses:
EVANGELINE ELWELL,
J. B. SCHAEFER.

Copies of this patent may be obtained for five cents each, by addressing the "Commissioner of Patents, Washington, D. C."